US009992037B2

United States Patent
Lim et al.

(10) Patent No.: US 9,992,037 B2
(45) Date of Patent: Jun. 5, 2018

(54) METHOD FOR AUTOMATICALLY MAPPING SMART PLUG AND ELECTRONIC DEVICE CONNECTED THERETO IN HOME GATEWAY AND DEVICE THEREFOR

(71) Applicant: Samsung Electronics Co., Ltd., Suwon-si, Gyeonggi-do (KR)

(72) Inventors: Yunjae Lim, Suwon-si (KR); Dongik Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/121,235

(22) PCT Filed: Mar. 17, 2015

(86) PCT No.: PCT/KR2015/002578
§ 371 (c)(1),
(2) Date: Aug. 24, 2016

(87) PCT Pub. No.: WO2015/142034
PCT Pub. Date: Sep. 24, 2015

(65) Prior Publication Data
US 2017/0019266 A1    Jan. 19, 2017

(30) Foreign Application Priority Data

Mar. 19, 2014 (KR) .................. 10-2014-0032038

(51) Int. Cl.
*H04L 12/28* (2006.01)
*H04L 12/64* (2006.01)

(52) U.S. Cl.
CPC ...... *H04L 12/2823* (2013.01); *H04L 12/2809* (2013.01); *H04L 12/6418* (2013.01); *H04L 2012/2841* (2013.01)

(58) Field of Classification Search
CPC ............. H04L 12/2823; H04L 12/2809; H04L 12/6418; H04L 2012/2841
See application file for complete search history.

(56) References Cited

U.S. PATENT DOCUMENTS

| 8,461,725 B1 * | 6/2013 | Stubbs | ..................... H01H 9/54 |
| | | | 307/140 |
| 2012/0049639 A1* | 3/2012 | Besore | .................. G01K 3/005 |
| | | | 307/97 |

(Continued)

FOREIGN PATENT DOCUMENTS

| JP | 2013-236529 A | 11/2013 |
| KR | 10-2009-0077327 A | 7/2009 |

(Continued)

*Primary Examiner* — Thai Nguyen
(74) *Attorney, Agent, or Firm* — Jefferson IP Law, LLP

(57) ABSTRACT

A method according to an embodiment of the present invention relates to a method for automatically mapping a smart plug and an electronic device connected thereto in a home gateway. The method may comprise the steps of: deleting pre-stored mapping information when a signal received from the smart plug satisfies a condition requiring remapping to the electronic device; configuring a mapping candidate group on the basis of data included in the signal received from the smart plug and information stored for the electronic device when a status change notification signal is received from a predetermined electronic device within a preconfigured time; and when it can be determined that one particular electronic device from among the configured candidate group has been mapped to the smart plug, automatically mapping the corresponding electronic device and the smart plug in a state that the corresponding electronic device is connected to the smart plug.

14 Claims, 8 Drawing Sheets

(56) References Cited

U.S. PATENT DOCUMENTS

2012/0089263 A1* 4/2012 Park .................. H02J 13/001
                                                   700/291
2013/0132008 A1   5/2013 Borean et al.

FOREIGN PATENT DOCUMENTS

| KR | 10-2012-0037551 A | 4/2012 |
| KR | 10-2012-0138253 A | 12/2012 |
| KR | 10-2013-0091592 A | 8/2013 |

\* cited by examiner

FIG. 3

| 802.15.4 10B | Network 8B | Security 14B | APS 8B | Frame Control 1B | Sequence Number 1B | Command Id 1B | HAP Payload 310 |

300

(a)

| Attribute | Value | Description | attribute |
|---|---|---|---|
| Currentsummation Delivered | 0x000000000000 ~ 0xffffffffffff | A 48-bit unsigned integer value indicating accumulative power amount updated periodically. After power-on, the plug reports an accumulation value at an interval of 1 minute. The host may configure the reporting period of the plug. | Read & Report |
| Unit of Measure | 0x00 fixed | kWh is used as unit of measure. | Read Only |
| Metering Device Type | 0x00 fixed | electricity metering | Read Only |
| Summation Formatting | 0x6A (fixed) | Fractional part of 2 digits, and rest part is defined as an integer. | Read Only |

(b)

| Attribute | Value | Description | attribute |
|---|---|---|---|
| Instantaneous Active Power (ID : 0xff01) | 0x00000000 ~ 0xffffffff | A 32-bit unsigned integer value indicating accumulative power amount updated periodically | Read Only |
| Summation Formatting | 0x42 (fixed) | Fractional part of 2 digits, and rest part is defined as an integer. W is used as unit of measure. | Read Only |

FIG. 6
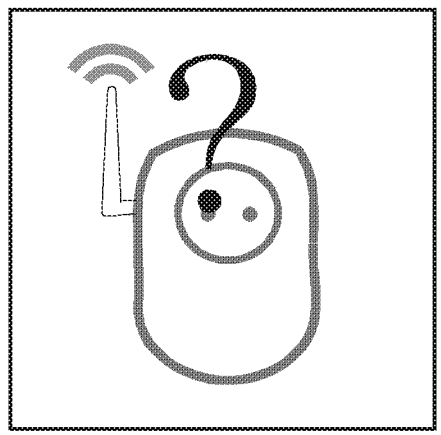
[a]
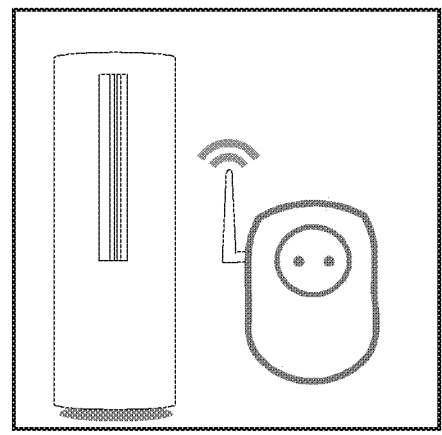
[b]

METHOD FOR AUTOMATICALLY MAPPING SMART PLUG AND ELECTRONIC DEVICE CONNECTED THERETO IN HOME GATEWAY AND DEVICE THEREFOR

TECHNICAL FIELD

The present invention relates to a method and apparatus for mapping a smart plug and electronic devices connected thereto and, in particular, to a method and apparatus for mapping the smart plug and the electronic devices connected thereto automatically.

BACKGROUND ART

Every single electronic device consumes electrical energy to operate. The electrical energy can be supplied from a socket via a power cord of which one end is connected to the electronic device and the other end is connected to the socket by means of a plug or from a battery that generates the electronical energy through chemical reaction. Such electronic devices are designed in various forms for use in diverse fields. For example, all types of household electrical appliances operate on electricity. Also, almost all of the devices for use in factories and offices operate on electricity.

As aforementioned, the electricity is the most common and essential source of energy in our everyday lives. Recently, most countries are striving to generate electricity as one of the best alternative energies safely at low costs and conducting researches on how to save electrical energy.

Meanwhile, the household appliances are becoming smarter in line with the development of the information and communication technology. The household appliances are evolving to intelligent electronic devices equipped with supplementary functions including the communication function in addition to their unique functions. Such advanced household appliances are called smart household appliances. Typically, smart household appliances are likely to be equipped with a self-power measurement function and capable of sharing measurement results though a wired/wireless communication interface. The smart household appliances allow users to control them remotely and use them for various purposes, e.g., for measuring and reporting power consumptions thereof.

However, it is predicted that it takes relatively long time for smart household appliances to be popularized in the market. Furthermore, the high switching costs from the legacy household appliances to the smart household appliances slow down the popularization of the smart household appliances.

Smart-plug is a transition technology developed for making it possible to implement a smart home system with the legacy household appliances and, typically, the smart plug has a function of measuring power consumption of a household appliance and transmitting the measurement result to another device. The smart plug makes it possible to implement the smart home with the legacy household appliances. That is, the smart plug is capable of measuring the power consumptions of the electronic devices connected thereto in both the idle and active states and reporting the state-specific power consumptions to the user. It may also be possible for the user to control the smart plug remotely to turn on/off the electronic device connected thereto.

DISCLOSURE OF INVENTION

Technical Problem

Typically, the smart plug is plugged into an indoor socket to supply power to the electronic devices connected thereto. That is, the smart plug itself is supplied with power from the indoor socket. The electronic devices are connected to the smart plug by means of a plug such that the smart plug feeds the power to the electronic devices connected thereto. That is, the smart plug is provided with both the socket and plug.

Typically, the smart plug is plugged into the socket on the indoor wall to which various electronic devices are selectively connected. For example, it may be likely for the user to plug a certain electronic device into the socket of the smart plug only when using the electronic device or for the connected electronic device to change for various reasons such as a move and furniture relocation. If the electronic device connected to the smart plug is changed for another electronic device, the user has to laboriously identify the connected device to check or control the power supplied by means of the smart plug.

The present invention aims to provide a method and apparatus for identifying the electronic device connected to the smart plug.

Also, the present invention aims to provide a method and apparatus for identifying the electronic device connected to the smart plug and reporting the identification result to another electronic device.

Solution to Problem

In accordance with an aspect of the present invention, a method for a home gateway to map a smart plug to an electronic device connected to the smart plug automatically includes deleting, when a signal received from the smart plug fulfils a condition for remapping the electronic device, mapping information stored previously, configuring, when a state change notification signal is received from an electronic device in a predetermined time period, a group of mapping candidates based on data included in the signal received from the smart plug and information stored in association with the electronic device, and mapping, when one of the candidates is mapped to the smart plug, the corresponding electronic device and the smart plug in the state of being connected to each other.

In accordance with another aspect of the present invention, a home gateway for mapping a smart plug and an electronic device connected thereto includes a gateway communication unit capable of communicating with at least one smart plug and at least one electronic device, a display unit for displaying status of the home gateway and mapping state between the smart plug and the electronic device, a memory unit for storing identity information and power consumption information of all registered electronic devices and mapping information of the smart plug connected to the respective electronic devices, and a control unit which deletes, when a signal received from the smart plug fulfils a condition for remapping the electronic device, mapping information stored previously, configures, when a state change notification signal is received from an electronic device in a predetermined time period, a group of mapping candidates based on data included in the signal received from the smart plug and information stored in association with the electronic device, and maps, when one of the candidates is mapped to the smart plug, the corresponding electronic device and the smart plug in the state of being connected to each other.

Advantageous Effects of Invention

The smart plug of the present invention is advantageous in terms of identifying the electronic device connected to the smart plug automatically and reporting the identification result to another electronic device. Also, the present invention is advantageous in terms of improving user convenience by negating the necessity of changing the connection configuration required whenever the connected electronic device is changed. Also, the present invention is advantageous in terms of allowing the user to control the connected electronic devices easily using the information on the electronic device connected to the smart plug.

BRIEF DESCRIPTION OF DRAWINGS

FIG. 3 is a diagram illustrating a format of data transmitted from the smart plug to the home gateway according to an embodiment of the present invention, FIG. 6 is diagram illustrating exemplary screen displays presenting the mapping process in progress and mapping result in the case that the home gateway has a display device.

MODE FOR THE INVENTION

Exemplary embodiments of the present invention are described with reference to the accompanying drawings in detail. The same reference numbers are used throughout the drawings to refer to the same or like parts. The drawings are provided to help understanding the present invention but not intended to be limiting the present invention in shape and arrangement. Detailed description of well-known functions and structures incorporated herein may be omitted to avoid obscuring the subject matter of the present invention. In the following, descriptions are made of only the parts necessary for understanding the operations in accordance with various embodiments of the present invention but not the other parts to avoid obscuring the subject matter of the present invention.

Figure 1A:
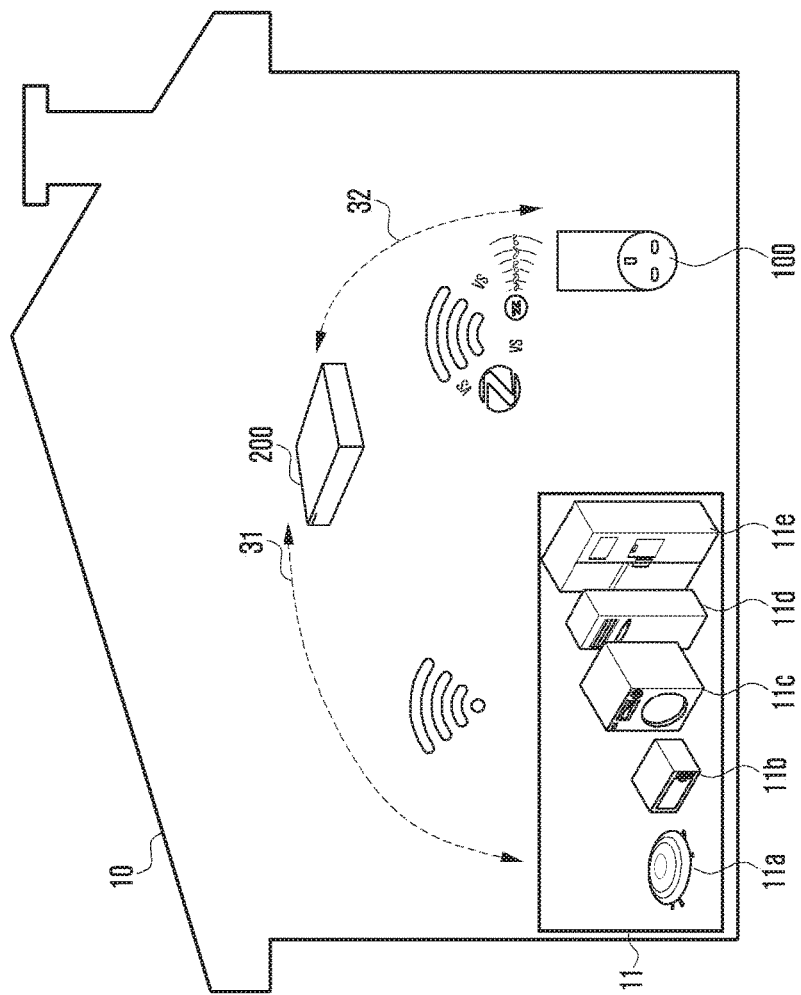
FIGS. 1A and 1B are diagrams illustrating a control architecture for a home gateway or smart home server to control electronic devices connected to a smart plug according to various embodiments of the present invention.
Figure 1B:
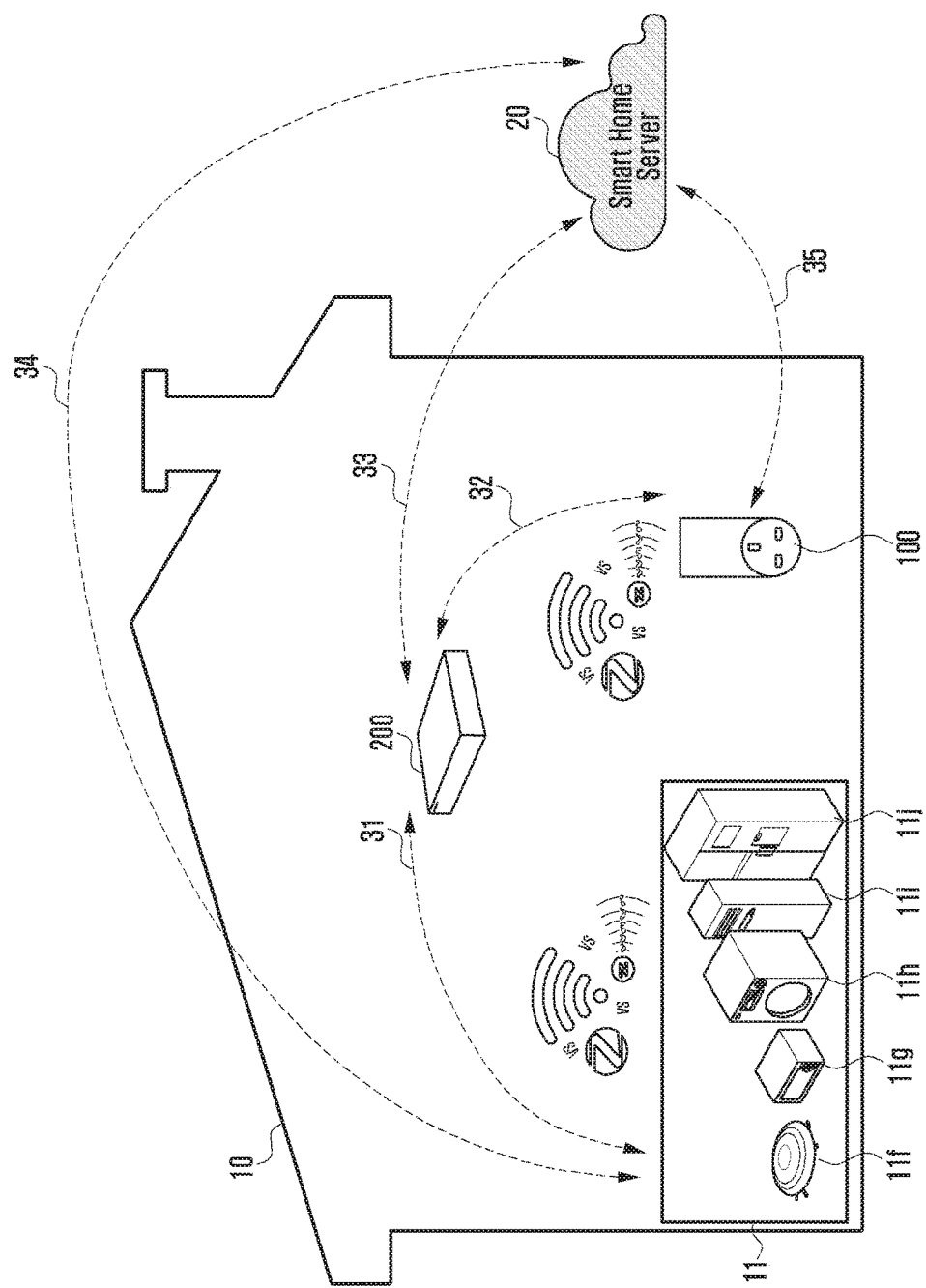

FIGS. 1A and 1B are diagrams illustrating a control architecture for a home gateway or smart home server to control electronic devices connected to a smart plug according to various embodiments of the present invention.

Referring to FIG. 1A, the indoor environment 10 includes an electronic device group 11, a smart plug 100 to which the electronic device group 11 can connect, and a home gateway 200. The home gateway 200 may check the electronic devices connected to the smart plug 100 and determine the identifiers of the electronic devices. The electronic device group 11 may include a plurality of electronic devices 11a, 11b, 11c, 11d, and 11e. In FIG. 1A, it is assumed that the electronic devices 11a, 11b, 11c, 11d, and 11e communicate with the home gateway 200 through a Wi-Fi network. However, even when the electronic devices 11a, 11b, 11c, 11d, and 11e have no radio communication capability, the present invention may be applied as described hereinafter.

In the embodiment of FIG. 1A, the home gateway 200 operates as an energy manager. However, the home gateway 200 may be embedded in a laptop computer, a Personal Computer (PC), an apparatus operating as the energy manager, or a specific electronic device depending on the case. In the embodiment of FIG. 1A, the description is directed to the case where the home gateway 200 is implemented in an independent form for convenience of explanation.

The home gateway 200 may register the electronic devices 11a, 11b, 11c, 11d, and 11e and the smart plug 100 and store the registration information and, if the connection to the smart plug 100 is switched between the smart plug 100 and the electronic devices, the home gateway 200 may perform mapping automatically and change the registration. A description thereof is made with reference to accompanying drawings.

One or more electronic devices may be connected to the smart plug 100. For example, if the smart plug 100 is implemented in the form of a multi-tap having a plurality of sockets, two or more electronic devices may be connected to the smart plug 100. The smart plug 100 may communicate with the home gateway 200 through a communication protocol such as Wi-Fi, ZigBee, or Z-wave as shown in FIG. 1A.

The electronic devices 11a, 11b, 11c, 11d, and 11e communicate with the home gateway 200 through the Wi-Fi protocol as denoted by reference number 31 in FIG. 1A, and the smart plug communicates with the home gateway 200 as denoted by reference number 32.

Referring to FIG. 1B, the indoor environment 10 may further include a smart home server 20 in comparison with that of FIG. 1A. Referring to FIG. 1B, the electronic devices 11f, 11g, 11h, 11i, and 11j of the electronic device group 11 may support a Wi-Fi, a ZigBee, and/or a Z-wave in comparison with that FIG. 1A.

The smart home server 20 may have the same database as the home gateway 200. For example, the smart home server 20 may have the information on the electronic device group 11 and information on the mapping between the smart plug and the electronic devices 11f, 11g, 11h, 11i, and 11j mapped thereto. The smart home server 20 may also have the information on the electronic devices located in a home environment different from the home environment of FIG. 1B and the information of the mapping between the smart plug and the electronic devices connected thereto. For example, the smart home server 20 may have the information on the mapping between the smart plugs and the electronic devices connected to the smart plugs that are located in the two or more respective indoor environments. The user may access the smart home server 20 by means of a specific electronic device. The user may access to the smart home server 20 to control the electronic devices or the smart plug included in the corresponding indoor environment.

The electronic devices 11f, 11g, 11h, 11i, and 11j of the electronic device group 11 may connect to the smart home server 20 directly or via the home gateway 200 and transmit to the home server 20 their device identifiers and/or power information. The smart plug 100 may also connect to the smart home server 20 directly or the home gateway 200 and transmit to the home server 20 the power information of the electronic devices connected thereto.

As described with reference to FIG. 1A, one or more electronic devices may be connected to one smart plug. For example, if the smart plug 100 is implemented in the form of a multi-tap having a plurality of sockets, two or more electronic devices may be connected to the smart plug 100. The smart plug 100 according to the present invention may calculate instantaneous power and/or accumulative power at the activation of the electronic device connected to the smart plug and transmit the calculation result to the home gateway 200 and/or the smart home server 20. The smart plug 100 may communicate with the home gateway 200 and/or the home server 20 through a communication protocol such as Wi-Fi, ZigBee, and Z-wave.

Figure 2:
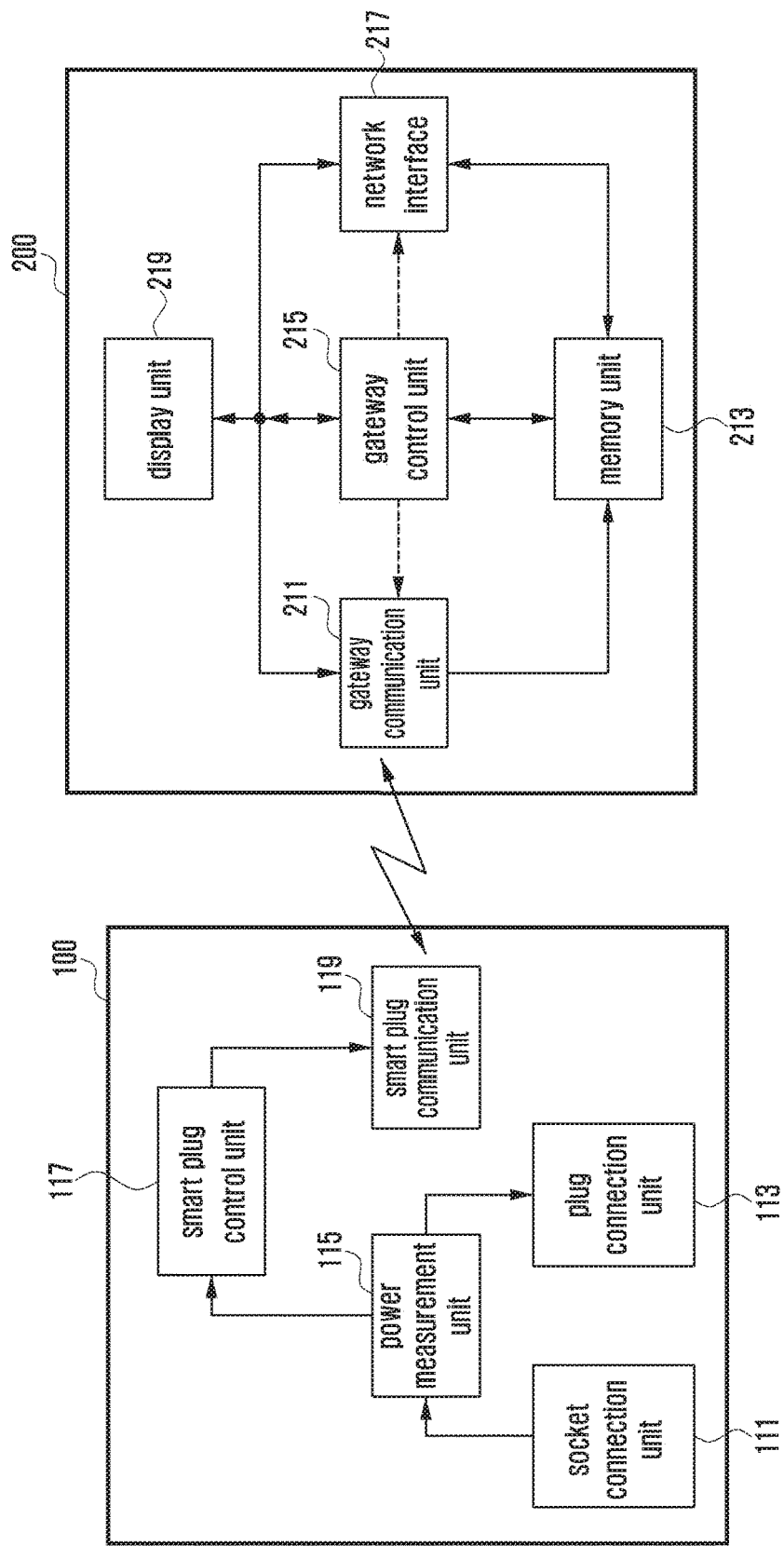
FIG. 2 is a block diagram illustrating configurations of a smart plug and a gateway according to an embodiment of the present invention.

FIG. 2 is a block diagram illustrating configurations of a smart plug and a gateway according to an embodiment of the present invention.

Referring to FIG. 2, the smart plug 100 may include a socket connection unit 111, a plug connection unit 113, a power measurement unit 115, a smart plug control unit 117, and a smart plug communication unit 119.

The socket connection unit 111 may be electrically connected to the socket from which the power is supplied and may include a circuit for detecting the connection to the socket. For example, the socket connection unit 111 may have a mechanical structure for detecting the connection to the socket or a circuitry for detecting power supply from the socket. The plug connection unit 113 may be designed to allow for connection of the plug of an electronic device and include a circuit for detecting the connection of the plug of the electronic device. For example, the plug connection unit 113 may have a mechanical structure for detecting the connection of the plug of an electronic device.

The power measurement unit 115 may measure the instantaneous power supplied from the socket connection unit 111 to the plug connection unit 113. That is, the power measurement unit 115 may measure power supply amount from the socket connection unit 111 to the electronic device via the plug connection unit 113 periodically. The power measurement unit 115 may calculate accumulated power amount. In the following description, it is assumed that the power measurement unit 115 may measure the instantaneous power and report the measurement information to the smart plug control unit 117.

The smart plug control unit 117 may control the overall operations of the smart plug. For example, the smart plug control unit 117 may control to supply or block the power to the electronic device and transmit and receive data to and from another electronic device by means of the smart plug communication unit 119. The smart plug control unit 117 may calculate the accumulative power by accumulating the instantaneous power measured by the power measurement unit 115.

The smart plug communication unit 119 may perform communication through a communication protocol such as Wi-Fi, ZigBee, and Z-wave. The smart plug communication unit 119 may communicate with other electronic devices, e.g. home gateway 200, smart home server 20, and electronic device registered by the user through a predetermined communication protocol.

Although not shown in FIG. 2, the smart plug may include an internal memory. The internal memory of the smart plug may store a value of accumulative power acquired by accumulating the instantaneous powers, control data for use in control by the smart plug control unit 117, and address information of the home gateway 200 capable of communicating with the smart plug, the smart home server, and/or the electronic device registered by the user. In the following description, it is assumed that the memory of the smart plug is embedded in the smart plug control unit 117.

The home gateway 200 may include a gateway communication unit 211, a memory unit 213, a gateway control unit 215, a network interface 217, and a display unit 219.

The gateway communication unit 211 may communicate with the smart plug 100 or another electronic device through a predetermined communication protocol. For example, the gateway communication unit 211 may perform communication with the smart plug 100 through at least one of the Wi-Fi protocol, ZigBee protocol, and Z-wave protocols and with another electronic device through the communication protocol supported thereby.

The memory 213 may include a region for storing data for use in controlling the home gateway 200 and generated during the control, a region for storing information received from the smart plug 100, and a region for storing the information mapping the smart plug and the electronic devices.

The network interface 217 may allow the home gateway 200 to transmit/receive data through a network, e.g., Internet and wired/wireless communication networks. The network interface 217 may make it possible for the home gateway 200 to communicate with the connected network.

The display unit 219 may display various informations (e.g., home gateway status, text data, and connection information between an electronic device and the smart plug) to the user. The display unit 219 may be implemented with one of Liquid Crystal Display (LCD) and Active Matrix Organic Light-emitting diodes (AM-OLED). The display unit 219 may be implemented so as to be flexible, transparent, detachable, or wearable. The display unit 219 may include a touch panel for detecting a touch input made by the user and a module.

The gateway control unit 215 may control the overall operations of the home gateway 200 and map the smart plug 100 and electronic devices automatically according to the present invention. If the electronic device connected to the smart plug 100 is changed for another electronic device, the gateway control unit 215 detects the change and maps the smart plug and the connected electronic device through authentication. A description thereof is made later in detail with reference to an accompanying flowchart.

As described above, the smart plug 100 may connect to an electronic device and provide the home gateway 200 with the information on the power supply to the electronic device. The home gateway 200 may detect the connection between the smart plug and the electronic device based on the information received from the smart plug 100 and/or the electronic device and maps the smart plug and the electronic device automatically.

The smart plug 100 and the home gateway 200 may communicate through one of the Wi-Fi, ZigBee, and Z-wave protocols as described above. At this time, if the smart plug 100 and the home gateway 200 communicate through the ZigBee communication protocol, the data transmitted through the ZigBee protocol are formatted as shown in FIG. 3.

FIG. 3 is a diagram illustrating a format of data transmitted from the smart plug to the home gateway according to an embodiment of the present invention.

As shown in FIG. 3, the data 300 transmitted by the smart plug 100 may include 10-byte ZigBee information (802.15.4 10B), 8-byte network information (Network 8B), 14-byte security information (Security 14B), 1-byte frame control information (Frame Control 1B), 1-Byte Sequence Number (Sequence Number 1B), 1-byte command identifier (Command id 1B), and information on the power consumption of the electronic device connected to the smart plug 100 (HAP Payload) 310.

The power consumption information of the electronic device connected to the smart plug 100 may include both the accumulative power amount and instantaneous power amount or one of the accumulated and instantaneous power amounts. Part (a) of FIG. 3 shows the data format for the case of transmitting the accumulated power amount, and part (b) of FIG. 3 shows the data format for the case of transmitting the instantaneous power amount.

The data formation of part (a) for the case of transmitting the accumulated power amount may include summation of currents delivered through the smart plug (Currentsummation Delivered), power amount measured by the electronic device connected to the smart plug (Unit of Measure), type of the metering device (Metering Device Type), and summation format (Summation Formatting).

Brief descriptions are made of the respective information items. The Currentsummation Delivered may be set to a value in the range of 0x000000000000~0xffffffffffff. The Currentsummation Delivered may be set to a 48-bit unsigned integer (int) value as shown in the description column. The Currentsummation Delivered may be update the accumulated amount of the power consumed by the electronic device connected to the smart plug at a predetermined period, e.g., 1 minute and 2 minutes. The predetermined period may be changed by the home gateway 200 or the smart home server 20. The accumulative power value of the consumed power is transmitted to the home gateway 200 or the smart home server 20 whenever the accumulative power amount is updated or at a time interval, e.g., every two or three updates of the accumulative power amount.

Next, the accumulative power amount may include the information on the power amount measured directly by the electronic device (Unit of Measure). This information may be included in the case that the electronic device provides the smart plug with the accumulative power. The Unit of Measure may be kilowatt [kWh] shown in the description column.

Third, the Metering Device Type indicates the type of the device metering power in the smart plug or the electronic device. Finally, the Summation Formatting indicates the format of the floating-point number consisting of a fractional part of two digits and an integer part.

Next, the data formation of part (b) for the case of transmitting the instantaneous power amount may include Instantaneous Active Power and Summation Formatting information.

As shown in part (b), the Instantaneous Active Power may be set to a value in the range of 0x00000000~0xffffffff in the form of a 32-bit unsigned integer (int) as shown in the description column. The Currentsummation Delivered may update the accumulated amount of the power consumed by the electronic device connected to the smart plug at a predetermined period, e.g., 1 minute and 2 minutes. The Summation Formatting exemplified in part (b) indicates the format of the floating-point number consisting of a fractional part of two digits and an integer part.

Figure 4:
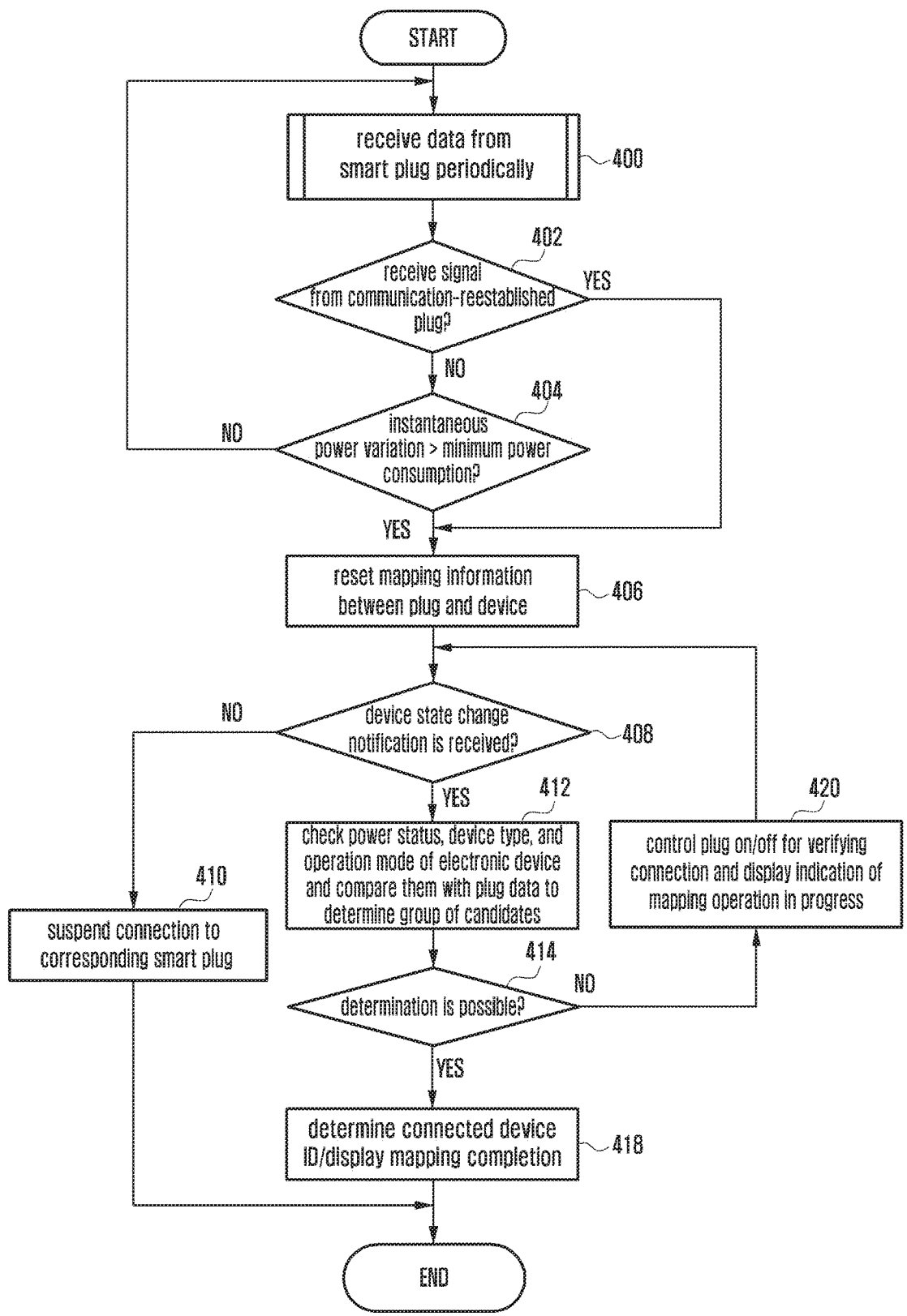
FIG. 4 is a flowchart illustrating a procedure for a home gateway to receive data from a smart plug according to an embodiment of the present invention.

FIG. 4 is a flowchart illustrating a procedure for a home gateway to receive data from a smart plug according to an embodiment of the present invention.

A description is made of the operation of the home gateway 200 to receive data from the smart plug 100 according to the present invention with reference to FIG. 4. Although the description is directed to the case where the operation is performed by the home gateway 200, it may also be possible for the smart home server 20 to perform the same or similar operation. In this case, the smart home server 20 may receive the corresponding data from the smart plug 100 directly or via another device. For example, the smart home server 200 may receive the data transmitted by the smart plug via the home gateway 200 or a communication-enabled electronic device such as smartphone. It may be possible to perform the operation identical with or similar to that of FIG. 4 using the data received as above.

The gateway control unit 15 receives data from the smart plug by means of the gateway communication unit 211 periodically at step 400. The smart plugs that transmit the data periodically may include the smart plugs connected to indoor sockets and the smart plugs delivering power to certain electronic device in the state of being connected to the indoor sockets. The gateway control unit 215 may receive data from the corresponding smart plugs periodically.

If the data are received from the smart plug, the gateway control unit 215 determines whether the data is received from the smart plug that has reestablished a communication at step 402. The reason for determining whether the data is received from the smart plug which has reestablished the communication at step 402 is that the connection to the smart plug may change. For example, the smart plug may not transmit data to the home gateway 200 in the state where no power is supplied thereto or there is not electronic device connected thereto.

If the smart plug is not supplied with power, this may be the case where the smart plug is not plugged into any indoor socket. Accordingly, if the power is supplied after a certain time period, there is a possibility in which the mapping between the smart plug and the electronic device connected thereto has changed. If an electronic device is connected to the smart plug in the state that there is no connected electronic device, the connected electronic device may be the old electronic device which has been connected or a new electronic device.

The gateway control unit 215 determines whether the data is received from the smart plug that has reestablished the communication at step 402 to check whether the mapping between the smart plug and the connected electronic device has changed.

If the data is not received from a smart plug that has reestablished the communication at step 402, the gateway control unit 215 determines whether the instantaneous power variation is greater than minimum power consumption at step 404. The reason for determining whether the instantaneous power variation is greater than minimum power consumption is to determine whether the electronic device connected to the smart plug is switched from the inactive state to the active state. If the instantaneous power variation is greater than minimum power consumption at step 404, this means that the smart plug is in the active state and thus it may be possible to change the connection state of the electronic device connected to the smart plug.

If it is determined that either the communication is reestablished or the instantaneous power variation is greater than a minimum power consumption, the procedure goes to step 406 and, otherwise, the procedure returns to step 400. That is, if the mapping between the smart plug and the electronic device connected thereto can be changed, the procedure goes to step 406 and, otherwise, step 400.

If the procedure goes from step 402 or 404 to step 406, the gateway control unit 215 may reset the mapping information of the corresponding smart plug in the table storing the mapping information between the smart plug and the connected electronic device. The table storing the mapping information between the smart plug and the connected electronic device may be exemplified as shown in table 1.

TABLE 1

| Device ID | Device Name | Device Type | Power State | Modified Date | Sub-device ID | Power Consumption |
|---|---|---|---|---|---|---|
| 12c1776b | Living room air conditioner | Aircon | Off | 2014 Jan. 2 | 00A005050000A0DA | 2000 kW |
| 0a23cbc7 | Bed room air conditioner | Aircon | Off | 2014 Jan. 2 | | 1500 kW |
| 3cc7daeb | Laundry machine | Wash | Off | 2014 Jan. 5 | | 500 kW |
| F8de7225 | Living room TV | TV | On | 2014 Jan. 5 | 00A005050000A0E5 | 50 kW |
| A2787925 | Bed room TV | TV | Off | 2014 Jan. 5 | | 10 kW |
| C448ea9e | Refrigerator | REF | On | 2014 Jan. 5 | 7825ADF1000000BB | 300 kW |
| 81c20e54 | Dish washer | Dishwash | Off | 2014 Jan. 5 | — | — |
| . | . | . | . | . | . | . |
| . | . | . | . | . | . | . |
| . | . | . | . | . | . | . |

The memory unit 213 may store the table including device ID, device name, device type, power state, last modified date, sub-device ID, and power consumption information. Here, the sub-device ID may be the smart plug ID. The smart plugs may receive the power state information of the corresponding electronic device from the electronic device and/or the smart plug as a sub-device.

A description is made of the case where the procedure goes to step 406 in FIG. 4. At step 406, the gateway control unit 215 resets the mapping information between the smart plug and the electronic device. For example, if either the instantaneous power variation of the electronic device identified with the sub-device identifier of 00A005050000A0DA in table 1 is greater than the minimum power consumption or the communication is reestablished, the gateway control unit 215 deletes the sub-device ID corresponding to the living room air conditioner. That is, the gateway control unit 215 deletes only the sub-device ID while maintaining the device ID, device name, device type, power state, last modified date, and power consumption information mapped to the sub-device ID of 00A005050000A0DA.

After deleting the sub-device ID, the procedure goes to step 408. At step 408, the gateway control unit 215 determines whether a device state change notification is received in a predetermined time period. For example, if the bedroom air conditioner powers on, it transmits a power-on signal including its ID of 0a23ccbc7 to the home gateway 200. Accordingly, the gateway control unit 215 may receive the device state change notification information in the predetermined time period at step 408.

However, the device state change notification may not be received in a certain situation. For example, if an obstacle appears between the bedroom air conditioner and the home gateway 200 instantaneously, the channel condition may goes bad abruptly, resulting in signal loss. If it is determined that the device state change notification information is not received at step 408, the gateway control unit 215 may suspend connection to the corresponding smart plug at step 410.

For the suspended smart plug, the home gateway 200 transmit a signal requesting for reporting on/off information to all electronic devices and resets the smart plug based on the information received from the respective electronic devices. In another method, the electronic devices that are in on-state may transmit the state change notification signal to the home gateway 200 at a predetermined period. In another method, the electronic devices may transmit the state change notification signal to the home gateway 200 and, if no acknowledgement message is received, retransmit the state change notification signal. Through one of the above methods, it may be possible to map the suspended smart plug and the electronic device connected thereto.

If the device state change notification signal is received in the predetermined time period, the gateway control unit 215 checks the power status, device type, and operation mode of the electronic device and compares the information with the plug data to determine a group of candidates at step 412. Step 412 is performed for the following reasons.

As described above, the smart plug may basically provide the home gateway 200 with the instantaneous power information and/or the accumulative power information. The electronic devices may provide the home gateway 200 with their on/off state information. Accordingly, the home gateway 200 may check the ID of the smart plug 100, the instantaneous power information, and/or accumulative power information of the electronic device connected to the smart plug. The home gateway 200 may receive the device ID and the on/off state information from the electronic device.

The gateway control unit 215 may perform the operation of step 406 for one smart plug and receive the on/off signal from one electronic device during the time period for receiving the device state change notification signal at step 408. It may also be possible to perform the operation of step 406 for two or more smart plugs and receive the on/off signal from two or more electronic devices. In this case, it is impossible to map a specific smart plug to a specific electronic device accurately. A description thereof is made with reference to FIGS. 5A and 5B.

Figure 5A:
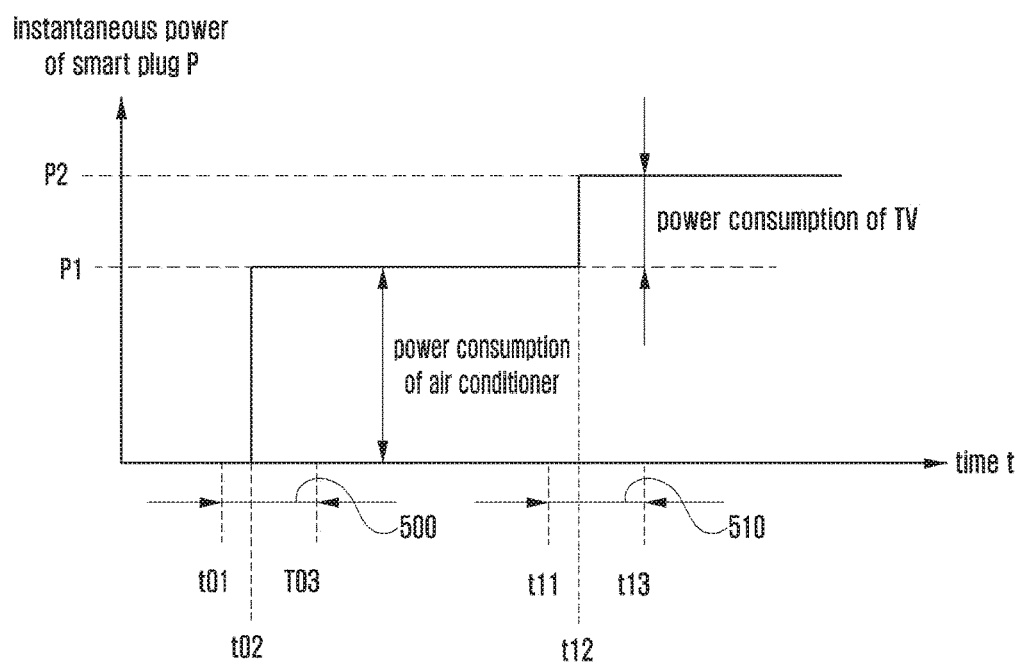
FIGS. 5A and 5B are timing diagrams illustrating the operations of reporting from the smart plug and electronic device to the home gateway when multiple electronic devices power on in series.
Figure 5B:
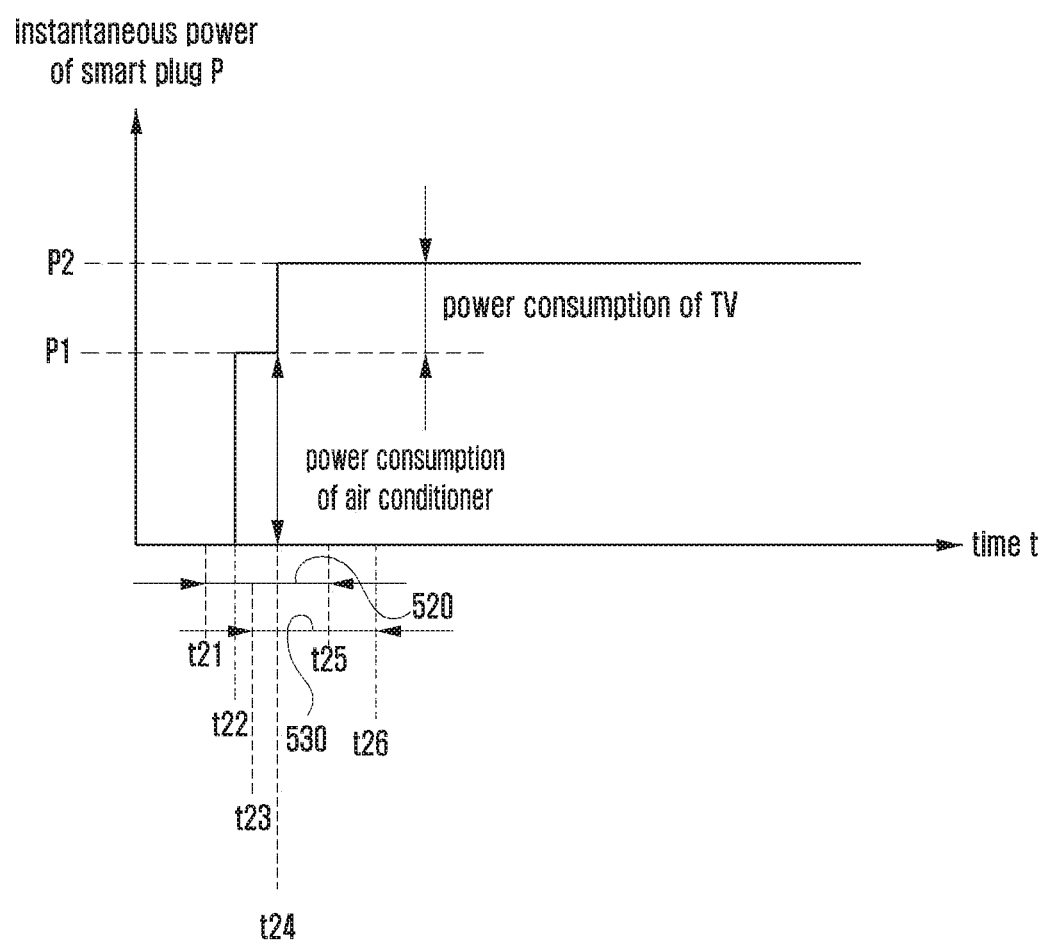

FIGS. 5A and 5B are timing diagrams illustrating the operations of reporting from the smart plug and electronic device to the home gateway when multiple electronic devices power on in series.

FIG. 5A is a timing diagram exemplifying the case where multiple smart plugs and electronic devices power on at distinct time intervals from the view point of the home gateway, and FIG. 5B is a timing diagram exemplifying the case where multiple smart plugs and electronic devices power one at indistinct time intervals from the view point of the home gateway.

FIG. 5A may correspond to the case where the home gateway 200 receives the instantaneous power information of the power consumption of the air conditioner at time point t02. If the instantaneous power information P1 of a certain electronic device is received from a certain smart plug at time point t02, the home gateway 200 may receive a device state change notification signal indicting power-on/off from the electronic device in the duration between the time point t01 little earlier than the time point t02 and the time point t03. The reason for giving the time duration between a time point little earlier than t02 and a time point little later than t02 that the electronic device may transmit the device state change notification signal earlier or later than the smart plug.

If the device state change notification signal is received from a certain electronic device during the time period 500, this is the case where the instantaneous power information and the device state change notification information are received from one smart plug and one electronic device, the home gateway 200 may map the corresponding smart plug and the corresponding electronic device, i.e. air conditioner.

If the instantaneous power information having the value of P2-P1 is received from a certain smart plug at time point t12, the home gateway 200 may receive the device state change notification signal indicating power-on/off from the electronic device in the duration between the time point t11 little earlier the time point t12 and the time point t13 little later than the time point t12. If the device state change notification signal is received from a certain electronic device, during the period 510, this is the case where the instantaneous power information and the device state change notification signal are received from one smart plug and one electronic device and thus the home gateway 200 may map the corresponding start plug and the corresponding electronic device, e.g., TV.

FIG. 5B corresponds to the case where multiple smart plugs and multiple electronic devices power on at indistinct time intervals.

Suppose that an air conditioner and a TV turn on at similar time points and the home gateway 200 receives the instantaneous power information and/or accumulative power information from the respective smart plugs. In FIG. 5B, the home gateway 200 may receive the instantaneous power information P1 and/or accumulative power information for the air conditioner from a predetermined smart plug at time point t22. As described above, the home gateway 200 may receive the device state change notification signal indicating power-on/off from a certain electronic device during a period between the time point t21 little earlier than the time point t22 and the time point t25 as denoted by reference number 520.

The home gateway 200 may receive the instantaneous power information and/or accumulative power information of P2-P1 for the TV from a certain smart plug at time point t24. As described above, the home gateway 200 may receive the device state change notification signal indicating power-on/off from a certain electronic device in the duration between the time point t23 little earlier than the time point t24 and the time point t26.

Then a problem occurs in that the time duration capable of receiving the state change notification signal from the air conditioner and the time duration capable of receiving the state change notification signal from the TV are overlapped between the time points t23 and t25. In the case that the time durations for the home gateway 200 to receive the state change notification signals from certain electronic devices are overlapped, it may be difficult to identify which electronic device is mapped to which smart plug. If the two electronic devices have similar power consumptions, it becomes more difficult to distinguish between the two electronic devices.

If the power consumption difference between the two electronic devices is large, it may be possible to distinguish between the two electronic devices based on the received instantaneous power values.

If the power consumption difference between the two electronic devices is large, the gateway control unit 215 may detect the mapping information of the corresponding electronic device using the instantaneous power information. However, if the power consumption difference between the two electronic devices is small, it is difficult for the gateway control unit 215 to distinguish between the two electronic devices.

In the present invention, the gateway control unit 215 may check the power state, type, and operation mode of the electronic device and compare compares between the electronic devices based on the instantaneous and/or accumulative powers received from smart plug to determine a group of candidates at step 412. Referring to table 1, the memory unit 213 of the home gateway 200 has the pre-stored power consumption information per electronic device. Accordingly, it is possible to determine the candidates by comparing between per-device power consumption informations.

However, if there are two or more electronic devices similar to each other in power consumption and they are all in the power-on state, it may be difficult to determine candidates. Accordingly, the gateway control unit 215 may determine a group of candidates at step 412 and then determine whether one of the candidates can be mapped at step 414. If it is determined that one of the candidates can be mapped, the procedure goes to step 416 and, otherwise, step 420.

A description is made of the case where one of the candidates cannot be mapped. If one of the candidates cannot be mapped at step 414, the gateway control unit 215 may perform on/off control on the smart plug for connection verification at step 420. If the smart plug turns on/off, this means that the power supply from the smart plug to the electronic device is blocked. Accordingly, if the power supply from the smart plug is blocked, the corresponding electronic device may send the home gateway 200 a power-off message. If the home gateway 200 has a display device (not shown in the drawing), it may display the information indicating that the smart plug and the electronic device are in a mapping process. With this information, the user can be aware that the smart plug and the electronic device are in the mapping process other than that the electronic device or the smart plug is malfunctioning. A description is made of the method for indicating that the smart plug and the electronic device are in the mapping process with reference to FIG. 6.

FIG. 6 is diagram illustrating exemplary screen displays presenting the mapping process in progress and mapping result in the case that the home gateway has a display device.

The gateway control unit 215 may control the display device to display the smart plug-electronic device mapping process in progress as shown in part (a) of FIG. 6. If it is supported to display texts, the gateway control unit 215 may control the display device to display a text message of "smart plug-electronic device mapping is in progress" or "mapping is in progress". If the mapping process has been completed, the gateway control unit 215 may control the display unit to display an image in which the smart plug and the electronic device are connected as shown in part (b) of FIG. 6. If it is supported to display texts, the gateway control unit 215 may control the display device to display a text message of "first smart plug and living room air conditioner are connected" or "first smart mapping has been completed" along with the image as shown in part (b) of FIG. 6.

In this way, if a certain smart plug powers on or off, the corresponding electronic device transmits the state change notification signal to the home gateway 200. Therefore, it is possible to check the electronic device mapped to a specific smart plug. It may also be possible to turn on the smart plug and map the corresponding electronic device thereto.

If a certain smart plug and an electronic device have been mapped through the above-described procedure, the gateway control unit 215 determines the identifier of the connected device and displays indication of the mapping completion at step 418. The mapping completion indication may be performed in a method identical with or similar to that described with reference to FIG. 6.

Although various embodiments of the present invention have been described using specific terms, the specification and drawings are to be regarded in an illustrative rather than a restrictive sense in order to help understand the present invention. Thus, the scope of the invention should be determined by the appended claims and their legal equivalents rather than the specification, and various alterations and modifications within the definition and scope of the claims are included in the claims

INDUSTRIAL EFFECTIVENESS

The present invention is applicable to all the types of electronic devices requiring power supply.

The invention claimed is:

1. A method for a home gateway to map a smart plug to a first electronic device connected to the smart plug automatically, the method comprising:
   receiving data from the smart plug, the data including power information; checking, in response to receiving the power information, whether previously stored mapping information between the smart plug and a second electronic device in a mapping table is correct;
   deleting at least part of the mapping table which includes correspondency between the smart plug and the second electronic device; receiving a state change notification signal from the first electronic device; and
   newly mapping, when the state change notification signal is received from the first electronic device in a predetermined time period, the smart plug and the first electronic device based on the data received from the smart plug and the state change notification signal received from the first electronic device.

2. The method of claim 1, further comprising displaying, when the first electronic device and the smart plug are mapped completely, information indicating that the smart plug and the first electronic device are mapped completely.

3. The method of claim 1, further comprising suspending, when the state change notification signal is not received in the predetermined time, connection of the smart plug.

4. The method of claim 3, further comprising mapping automatically based on information received from respective electronic devices in response to a signal transmitted to all electronic device to command all registered electronic device to report on/off information, based on an on-state signal reported periodically by the electronic device, or based on the state change notification signal retransmitted by an electronic device from which no acknowledgement signal is received.

5. The method of claim 1, wherein the power information comprises at least one of instantaneous power information and accumulative power information connected to the smart plug.

6. The method of claim 1, further comprising storing the automatically mapped data.

7. The method of claim 6, further comprising storing information on date when automatic mapping is updated along with the automatically mapped data.

8. A home gateway for mapping a smart plug and an electronic device connected thereto, the home gateway comprising:
   a gateway communication unit capable of communicating with at least one smart plug and at least one electronic device;
   a display unit for displaying status of the home gateway and mapping state between the smart plug and the electronic device;
   a memory unit for storing identity information and power consumption information of all registered electronic devices and mapping information of the smart plug connected to the respective electronic devices; and
   a control unit which receives data from the smart plug, the data including power information, checks, in response to receiving the power information, whether previously stored mapping information between the smart plug and a second electronic device in a mapping table is correct, deletes at least part of the mapping table which includes correspondency between the smart plug and the second electronic device, receives a state change notification signal from the first electronic device, and newly maps, when the state change notification signal is received from the first electronic device in a predetermined time period, the smart plug and the first electronic device based on the data received from the smart plug and the state change notification signal received from the first electronic device.

9. The home gateway of claim 8, wherein the control unit controls displaying, when the first electronic device and the smart plug are mapped completely, information indicating that the smart plug and the first electronic device are mapped completely.

10. The home gateway of claim 8, wherein the control unit suspends, when the state change notification signal is not received in the predetermined time, connection of the smart plug.

11. The home gateway of claim 10, wherein the control unit controls the communication unit to transmit to all registered electronic devices a signal commanding to report on/off information and performs mapping automatically based on information received from respective electronic devices in response to a signal transmitted to all electronic device, based on an on-state signal reported periodically by the electronic device, or based on the state change notification signal retransmitted by an electronic device from which no acknowledgement signal is received.

12. The home gateway of claim 8, wherein the power information comprises at least one of instantaneous power information and accumulative power information connected to the smart plug.

13. The home gateway of claim 8, wherein the control unit controls the memory unit to store the automatically mapped data.

14. The home gateway of claim 13, wherein the control unit controls the memory unit to store information on date when automatic mapping is updated along with the automatically mapped data.

* * * * *